US008727004B2

(12) United States Patent
Bull et al.

(10) Patent No.: US 8,727,004 B2
(45) Date of Patent: May 20, 2014

(54) METHODS OF TREATING SUBTERRANEAN FORMATIONS UTILIZING SERVICING FLUIDS COMPRISING LIQUEFIED PETROLEUM GAS AND APPARATUS THEREOF

(75) Inventors: Brad R. Bull, Duncan, OK (US); David M. Stribling, Duncan, OK (US); Calvin L. Stegemoeller, Duncan, OK (US); Leonard R. Case, Duncan, OK (US); Ronald G. Dusterhoft, Katy, TX (US); Gary P. Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 731 days.

(21) Appl. No.: 12/475,872

(22) Filed: Jun. 1, 2009

(65) Prior Publication Data
US 2009/0301719 A1 Dec. 10, 2009

Related U.S. Application Data (60) Provisional application No. 61/131,220, filed on Jun. 6, 2008.

(51) Int. Cl.
*E21B 43/26* (2006.01)
*E21B 19/00* (2006.01)

(52) U.S. Cl.
USPC .................... 166/308.4; 166/305.1; 166/90.1

(58) Field of Classification Search
None
See application file for complete search history.

(56) References Cited

U.S. PATENT DOCUMENTS

| 3,560,053 | A | | 2/1971 | Ortloff |
| 3,818,993 | A | | 6/1974 | Gogarty et al. |
| 4,622,155 | A | | 11/1986 | Harris et al. |
| 5,002,125 | A | * | 3/1991 | Phillips et al. ................ 166/271 |
| 5,799,734 | A | | 9/1998 | Norman et al. |
| 5,846,915 | A | | 12/1998 | Smith et al. |
| 6,511,944 | B2 | | 1/2003 | Taylor et al. |
| 7,270,141 | B2 | | 9/2007 | Dykstra |
| 7,341,103 | B2 | * | 3/2008 | Taylor et al. .................. 166/278 |

(Continued)

FOREIGN PATENT DOCUMENTS

WO  WO 2007/098606 A1  9/2007

OTHER PUBLICATIONS

International Search Report and Written Opinion for PCT/GB2009/001394, dated Aug. 31, 2009.

*Primary Examiner* — Angela M DiTrani
(74) *Attorney, Agent, or Firm* — McDermott Will & Emery LLP; Craig W. Roddy (57) ABSTRACT

Methods relating to servicing fluids that comprise gelled liquefied petroleum gas or servicing fluids that comprise a conventional gelled hydrocarbon fluid with liquefied petroleum gas are provided. In one embodiment, the methods of the present invention comprise providing a LPG servicing fluid comprising LPG and a gelling agent; pressurizing the LPG servicing fluid with one or more high-pressure pumps; introducing proppant particulates into at least a portion of the LPG servicing fluid using one or more high pressure pumps; and introducing the LPG servicing fluid comprising proppant particulates into at least a portion of a subterranean formation at a rate and pressure sufficient to create or enhance at least one or more fractures therein. In one embodiment, a gelling agent may be metered into the LPG on-the-fly.

20 Claims, 3 Drawing Sheets

(56) References Cited

U.S. PATENT DOCUMENTS

| | | |
|---|---|---|
| 7,516,793 B2 | 4/2009 | Dykstra |
| 2004/0214728 A1 | 10/2004 | Taylor et al. |
| 2005/0189112 A1* | 9/2005 | Taylor et al. ............... 166/278 |
| 2006/0037754 A1 | 2/2006 | Funkhouser |
| 2006/0065400 A1* | 3/2006 | Smith ..................... 166/308.1 |
| 2006/0176640 A1 | 8/2006 | Dykstra |
| 2006/0177203 A1 | 8/2006 | Dykstra |
| 2006/0231254 A1 | 10/2006 | Peskunowicz et al. |
| 2006/0235627 A1 | 10/2006 | Dykstra et al. |
| 2006/0289166 A1 | 12/2006 | Stromquist et al. |
| 2007/0029090 A1 | 2/2007 | Andreychuk et al. |
| 2007/0204991 A1* | 9/2007 | Loree et al. ............... 166/280.1 |
| 2008/0066911 A1 | 3/2008 | Luharuka et al. |
| 2008/0179056 A1 | 7/2008 | Dykstra |
| 2008/0183336 A1 | 7/2008 | Dykstra |
| 2008/0183415 A1 | 7/2008 | Dykstra |
| 2009/0301725 A1 | 12/2009 | Case et al. |

* cited by examiner

METHODS OF TREATING SUBTERRANEAN FORMATIONS UTILIZING SERVICING FLUIDS COMPRISING LIQUEFIED PETROLEUM GAS AND APPARATUS THEREOF

CROSS-REFERENCE TO RELATED APPLICATIONS

This application claims the benefit of U.S. Provisional Patent Application Ser. No. 61/131,220, filed Jun. 6, 2008, entitled "Method of Fracturing Subterranean Formations Utilizing High Efficiency Fracturing Fluids and Apparatus Therefore." This application is also related to co-pending U.S. patent application Ser. No. 12/475,895, filed concurrently herewith on Jun. 1, 2009, entitled "Proppant Addition Method and System." The entire disclosures of each of these applications are incorporated herein by reference.

BACKGROUND

The present invention relates to gelled fluids, and methods and apparatus for using liquefied petroleum gas in subterranean operations. More particularly, the present invention relates to servicing fluids that comprise gelled liquefied petroleum gas or servicing fluids that comprise a conventional gelled hydrocarbon fluid with liquefied petroleum gas and methods of using such servicing fluids in subterranean formations.

Servicing fluids are used in a variety of operations and treatments performed in oil and gas wells. Such operations and treatments include, but are not limited to, production stimulation operations, such as fracturing, and well completion operations, such as gravel packing.

An example of a production stimulation operation using a servicing fluid having particles suspended therein is hydraulic fracturing. That is, a type of servicing fluid, referred to in the art as a fracturing fluid, is pumped through a well bore into a portion of a subterranean zone to be stimulated at a rate and pressure such that fractures are formed or enhanced in a desired subterranean zone. The fracturing fluid is generally an ungelled liquid or gas, a gelled liquid, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using a servicing fluid having particles suspended therein is gravel packing. Gravel packing treatments are used, inter alia, to reduce the migration of unconsolidated formation particulates into the well bore. In gravel packing operations, particulates, referred to in the art as gravel, are carried to a well bore in a subterranean producing zone by a servicing fluid known as a carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel that is sized to prevent the passage of formation particulates through the pack with produced fluids, wherein the well bore may be oriented from vertical to horizontal and extend from tens of feet to thousands of feet. When installing the gravel pack, the gravel is carried to the formation in the form of a slurry by mixing the gravel with a carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

In carrying out hydraulic fracturing, frac packing, and gravel packing, fluid recovery oftentimes may be critical. Foamed fluids have been developed in part to provide enhanced fluid recovery through energization by a compressed gas phase. They also reduce the total amount of liquid used, typically by a factor of about four. Such foamed fluids have included various surfactants, known as foaming and foam stabilizing agents, for facilitating the foaming and stabilization of the foam produced when a gas is mixed with the servicing fluid. Thus, foamed fluids may be thought of as media in which a relatively large volume of gas is dispersed in a relatively small volume of liquid, usually with the aid of a surfactant that reduces the surface tension of the fluids. The most commonly used gases for foamed fracture fluids are nitrogen, carbon dioxide, and combinations of the two. Foamed servicing fluids may be preferred over conventional servicing fluids because they generally provide superior fluid recovery as well as excellent fluid loss control without forming a substantial filter cake. Enhanced fluid recovery is provided by the expansion of the gas in the foam when the pressure is released after the stimulation and/or treatment. This promotes flow of residual servicing fluid liquid back into the well, thus aiding in cleanup of the servicing fluid once the subterranean operation is complete.

The use of conventional aqueous-based servicing fluids in subterranean operations may present disadvantages. For instance, the high capillary pressures associated with the use of an aqueous system may restrict the flow of produced gaseous hydrocarbons such as methane. Capillary pressures of several thousand psi may result in low permeability formations when water is introduced, wherein the high pressure differential needed to initiate the fluid flow may result in extended fluid recovery times, long term losses in the relative permeability to gas and long term loss of effective fracture half length. Furthermore, the use of water in under-saturated reservoirs also may reduce permeability and associated gas flow through a permanent increase in the water saturation of the reservoir.

The use of a carbon dioxide miscible hydrocarbon servicing fluid may overcome these limitations through achievement of a miscible drive mechanism where produced methane is used to displace the hydrocarbon fracturing fluid from the formation. To facilitate this process, more volatile hydrocarbon blends may be used in place of traditional hydrocarbon servicing fluids such as diesel fuel. For example, carbon dioxide may be added to the hydrocarbon-based servicing fluids, inter alia, to increase the efficiency by which methane can displace it and provide increased energy for fluid recovery and thus its rate of recovery from the subterranean formation. However, increasing concentrations of dissolved carbon dioxide in the liquid hydrocarbon make it progressively more difficult to gel with phosphate ester and alkylphosphonic acid ester gel systems. As a result there is a limit to the concentration of carbon dioxide that may be present in such servicing fluids. For instance, if too high a concentration of carbon dioxide is present, the servicing fluid may not have a viscosity sufficient to carry the needed quantity of particulates to a desired location within a well bore, to adequately control fluid leak off, and to generate the desired fracture geometry. In some instances a pure carbon dioxide fluid may be injected as a spearhead fluid to help energize the reservoir and create a miscible solvent layer ahead of the fracturing fluid to assist in fluid recovery.

Moreover, as a fracture or a gravel pack is created, a portion of the liquid contained in the servicing fluid may leak off into the formation and/or may create a filter cake comprising deposited viscosifier on the walls of the fracture, well bore, or the formation. In addition, conventional water-based servicing fluids may comprise polysaccharide-based polymers, which may serve as a food source for bacteria. Therefore, when deposited in the subterranean formation, such polysaccharide-based polymers may produce a bio-mass that may reduce formation permeability. While formation of a filter cake during pumping may be desirable to help control fluid leak off, it is not desirable for the filter cake to be permanent since it may restrict subsequent gas and liquid flow.

High viscosity gelled hydrocarbon liquids have heretofore been utilized in treating subterranean formations penetrated by well bores, in hydraulic fracturing stimulation treatments. In such treatments, a high viscosity gelled liquid hydrocarbon fracturing fluid having particulate proppant material, e.g., sand, suspended therein is pumped through a well bore into a subterranean formation to be stimulated at a rate and pressure such that one or more fractures are formed and extended in the formation. The suspended proppant material is deposited in the fractures when the gelled hydrocarbon fracturing fluid is broken and returned to the surface. The proppant material functions to prevent the formed fractures from closing whereby conductive channels remain through which produced fluids can readily flow to the well bore.

Polyvalent metal salts of orthophosphoric acid esters have heretofore been utilized as gelling agents for forming high viscosity gelled liquid hydrocarbon fracturing fluids. Such gelled liquid hydrocarbon fracturing fluids have included proppant material and breakers for causing the fracturing fluids to break into relatively thin fluids whereby the proppant material is deposited in formed fractures and the fracturing fluid is produced back. Descriptions of such heretofore utilized high viscosity gelled liquid hydrocarbon fracturing fluids and methods of their use are set forth in U.S. Pat. Nos. 4,622,155 and 5,846,915, the entire disclosures of which are incorporated herein by reference. The gelled liquid hydrocarbon fracturing fluids described in the above patents utilize ferric iron or aluminum polyvalent metal salts of phosphoric acid esters as gelling agents and delayed breakers such as hard burned magnesium oxide.

While there are several benefits that can be achieved in using hydrocarbon based fracturing fluids in reservoirs where there is a significant amount of water sensitivity, there have also been safety concerns with the use of these fluids due to their flammability and in some cases high vapor pressure. Much of the safety exposure occurs around the on site blending units that are traditionally used to add all of the chemical additives to viscosify the hydrocarbon fluid and also to add the proppant agents to the gelled fluid as it is being pumped down hole. Conventional blenders incorporate proppant metering screws that have a rate of rotation that is matched with the downhole pumping rate so that precise amounts of proppant can be added per unit volume of the fluid. The mixing of the proppant in the hydrocarbon usually occurs in an open top blending tub. The open blending tub presents several potential concerns that have resulted in limited use of hydrocarbon based fracturing fluids in many locations around the world. Some of these concerns are: 1) high vapor pressure of the fracturing fluid which can result in hydrocarbon fumes accumulating in the top of the bender tub creating a potentially dangerous condition as it is dispersed into the atmosphere, and 2) the need for continuous blending units which require control of the inflow fluid rate as well as the proppant rate to ensure that the fluid level in the blending tub remains constant. Sudden shut downs or sudden increases in flow rates can cause the tub level to fluctuate and in extreme cases result in fluid over flowing causing serious spills of highly flammable and environmentally damaging fluids. While the use of gas blankets, in which a layer of dense carbon dioxide or other inert gas such a nitrogen gas is continuously maintained on the top of the blender tank and automatic tub level control systems have helped to minimize the level of exposure and the associated risk, potential for high risk exposure is still present.

Similarly, problems may be encountered as a result of the use of particular gelling agents in the high viscosity gelled liquid hydrocarbon fracturing fluids, i.e., the polyvalent metal salt of a phosphoric acid ester. That is, in recent years plugging of refinery towers, which process oil produced from formations fractured with gelled liquid hydrocarbon fracturing fluids, has caused many expensive, unplanned shutdowns. The plugging material is high in phosphorus and has been attributed to the phosphate esters used as gelling agents. The phosphate esters contribute volatile phosphorus which condenses on distillation tower trays, causing plugging. The volatile phosphorus may also carry over the tops of the distillation towers causing contamination of the hydrocarbon products produced. This problem has been addressed in U.S. Pat. No. 6,511,944, the entire disclosure of which is incorporated herein by reference.

The gelling of liquid petroleum gas ("LPG") comprising a mixture of varying amounts of methane, ethane, propane, butane and the like is disclosed in U.S. Pat. No. 7,341,103, the entire disclosure of which is incorporated herein by reference. In addition, U.S. Publication No. 20070204991 A1, the entire disclosure of which is incorporated by reference, provides a method for introducing proppant into an LPG fluid by pressuring the proppant in a pressure vessel with an inert gas and then metering that proppant into the LPG fluid utilizing a continuous blending unit to feed a high pressure pump which raises the pressure of the proppant containing slurry to a level sufficient to enter the subterranean formation. However, this method limits the proppant which can be delivered because of the specialized delivery apparatus required and potentially introduces an inert gas into the LPG fluid which can disrupt the pumping equipment. This method of proppant addition increases safety exposure of employees involved in the process of introducing the proppant into the LPG stream.

SUMMARY

The present invention relates to gelled fluids and methods for using LPG in subterranean operations. More particularly, the present invention relates to servicing fluids that comprise gelled LPG or servicing fluids that comprise a conventional gelled hydrocarbon fluid with LPG and methods of using such servicing fluids in subterranean formations.

In one embodiment, the methods of the present invention comprise providing a LPG servicing fluid comprising LPG and a gelling agent; pressurizing the LPG servicing fluid with one or more high-pressure pumps; introducing proppant particulates into at least a portion of the LPG servicing fluid using one or more high pressure pumps; and introducing the LPG servicing fluid comprising proppant particulates into at least a portion of a subterranean formation at a rate and pressure sufficient to create or enhance at least one or more fractures therein.

In another embodiment, the methods of the present invention comprise providing LPG; providing a gelling agent; metering the gelling agent into the LPG on-the-fly to form a LPG servicing fluid; pressurizing the LPG servicing fluid with one or more high-pressure pumps; and introducing the LPG servicing fluid into at least a portion of a subterranean formation.

In yet another embodiment, the methods of the present invention comprise providing LPG; providing a gelling agent; metering the gelling agent into the LPG on-the-fly to form a LPG servicing fluid; pressurizing the LPG servicing fluid with one or more high-pressure pumps; introducing proppant particulates into at least a portion of the LPG servicing fluid using one or more high pressure pumps; and introducing the LPG servicing fluid into at least a portion of a subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to gelled fluids and methods for using LPG in subterranean operations. More particularly, the present invention relates to servicing fluids that comprise gelled LPG or servicing fluids that comprise a conventional gelled hydrocarbon fluid with LPG (collectively referred to herein as "LPG servicing fluids") and methods of using such LPG servicing fluids in subterranean formations.

While the compositions and methods of the present invention may be useful in a variety of applications for a variety of reasons, such as in the stimulation of coal seams, they are particularly useful for stimulation and well completion operations, such as, but not limited to, fracturing, gravel packing and frac pack applications, performed in subterranean wells such as oil and gas wells. The LPG servicing fluids of the present invention are hydrocarbon based and therefore, they may be produced and even sold with the produced fluids and have a reduced environmental impact versus aqueous based fluids. Therefore, in some embodiments, the need to flare produced gas to the atmosphere may be eliminated. Similarly, there is no use of potable water injected into the subterranean formation and also none of the associated recovered fluid to dispose of because the LPG servicing fluid may be introduced into the sales line with produced hydrocarbons from the subterranean formation. In addition, by producing LPG fluids directly into a sales line, it is possible to achieve zero or near zero emissions during the initial flow and fracture clean up process.

Among the many advantages of the present invention, in certain embodiments, the present invention may eliminate the need for an onsite blending unit, which may help to eliminate the potential hazards associated with the use of hydrocarbon based fluids and to make the use of viscosified hydrocarbon based fluids more attractive from several aspects including; technical aspects, operational logistics, operational and environmental safety as well as reducing the required equipment and manpower on location. In some embodiments, this may be accomplished through an on-the-fly system for gelling a LPG servicing fluids using additives that are injected directly into the fluid stream and, in some embodiments, adding a liquid hydrocarbon based proppant suspension where a large volume of proppant is suspended in a relatively small volume of viscosified liquid hydrocarbon and transported to the job location in a suitable fluid transport unit. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

In some embodiments, the use of rate controlled high pressure pumping units, which may be monitored by a computer controlled process loop, may make it possible to precisely meter two streams of fluid together into a high pressure treating line that may be connected directly to a wellhead. As a result, there is no blending unit required to mix proppant into a LPG servicing fluid on the job location. Similarly, gelling agents for viscosifying a LPG servicing fluid may be added directly to the fluid stream before it enters the high pressure pumping units so that the fluid is viscosified as it is being pumped down hole. In some embodiments, the system is entirely closed minimizing any of the common risks associated with pumping hydrocarbon based fluids using conventional equipment.

In some embodiments, the LPG servicing fluids of the present invention may comprise a gelled LPG. In some embodiments, the LPG servicing fluids of the present invention may comprise LPG and a conventional gelled hydrocarbon fluid. In embodiments of the present invention wherein LPG is combined with a conventional hydrocarbon fluid, the LPG may be either gelled or ungelled.

As mentioned above, the LPG servicing fluids of the present invention comprise LPG. As used herein, the term "LPG" refers to a hydrocarbon provided in a liquid state that is a gas at standard conditions of 60° F. and 1 atmosphere (14.7 psia). Examples of such hydrocarbons include, but are not limited to, methane, ethane, propane, butane, iso-butane and various mixtures of such gases. In some embodiments, LPG suitable for use in the present invention may further comprise other hydrocarbon components that are a liquid at standard conditions, having five carbon atoms or more, which may be present in commercial supplies of LPG. In order to maintain its liquid form, sufficient pressure should be applied to the LPG and the servicing fluids of the present invention to maintain the fluid in a liquid state during the handling of the fluid on the earth's surface. This could require a surface storage pressure of up to 300 psi, dependent upon ambient conditions. Typical pumping pressures during well completion operations such as fracturing are commonly well over 1000 psi, ensuring the LPG will be a liquid while pumping on the surface and will remain fully dissolved in any liquid hydrocarbon added to it. Such pressures can be supplied using high pressure pumps. Among other things, the presence of the LPG in the LPG servicing fluids of the present invention may help maximize fluid recovery from the subterranean formation while minimizing formation damage associated with water-based fluids. For example, where a LPG servicing fluid is placed into a subterranean formation under pressure, when that pressure is released, the LPG may attempt to reach pressure equilibrium by flowing towards the lower pressure in the well bore and to the surface of the well. As the LPG attempts to return to the surface, it provides energy which facilitates removal of some or all of the remaining liquid portion of the servicing fluid from the well bore, a necessary step that occurs before the well is placed on production. Moreover, the volatility of LPG in the subterranean formation may act to reduce the viscosity of the LPG servicing fluids thereby allowing for easier recovery. In addition, the LPG may remove filter cake buildup after the treatment in the subterranean formation through energy provided by the vapor pressure of the LPG at the reservoir temperature. The use of LPG may reduce formation damage, inter alia, by reducing the high capillary pressures associated with water-based fluids while providing a means for fluid recovery.

While some embodiments of the present invention rely on a conventional gelled hydrocarbon fluid to provide viscosity, in some embodiments, the LPG itself may be gelled to provide or enhance the total fluid viscosity. In order to gel LPG, a gelling agent may be added. Any gelling agent known by those skilled in the art to be suitable for gelling hydrocarbon based fluids may be suitable for use in the present invention. Suitable gelling agents for use in the LPG servicing fluids of the present invention may include ferric iron or aluminum polyvalent metal complexes of orthophosphoric acid esters, or ferric iron or aluminum polyvalent metal complexes of alkylphosphonic acid esters, or ferric iron or aluminum polyvalent metal complexes of unsymmetrical dialkylphosphinic acids or mixtures thereof. Examples of such iron or aluminum polyvalent metal salts of an alkylphosphonic acid ester are provided in previously identified U.S. Pat. No. 6,511,944, the entire disclosure of which is incorporated herein by reference. The rate of viscosity increase can be governed to some degree by the choice of the polyvalent salt. The ferric based salts have been found to result in a more rapid increase in viscosity of LPG compared to the aluminum based salts which permits a more readily controlled on-the-fly mixing process to be used in handling the LPG. Where used, the gelling agent may be added to the LPG servicing fluids of the present invention in an amount sufficient to provide the desired degree of gelling based, inter alia, on the specific gelling agent used. In one embodiment, the gelling agent may be present in the LPG servicing fluids of the present invention in an amount of from about 0.1% to about 2.5% by weight of LPG present in the servicing fluid.

In another embodiment, the LPG servicing fluid may be gelled by the addition of a micellar solution comprising a viscoelastic surfactant such as described in U.S. Pat. No. 3,818,993, the entire disclosure of which is incorporated herein by reference thereto. Other surfactants that may be utilized include other non-ionic surfactants, cationic surfactants, anionic surfactants, or amphoteric surfactants. Examples of suitable non-ionic surfactants may include, but are not limited to, hydrofluoroether surfactants, alkyl sarcosinate, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated, propoxylated sulfated dodecyl phenols, alpha-olefin sulfonates, and other petroleum sulfonates. Examples of non-limiting suitable cationic surfactants may include methylpolyoxyethylene octadecanammonium chloride, methylpolyoxyethylene cocoalkylammonium chloride, isotridecyloxypropyl polyoxethylene methyl ammonium chloride, polyoxyethylene cocoalkylamines, polyoxyethylene tallowalkylamines, diallyl dimethyl ammonium chloride, N,N,N,trimethyl-1-octadecamonium chloride, and polyoxyethylene oleylamines. Examples of suitable anionic surfactants may include, but are not limited to, sodium xylenesulfonate. Examples of suitable amphoteric surfactants may include, but are not limited to, betaines such as cocamidopropyl betaines, alkyl betaines, alkyl amidopropyl betaines oleoamidopropyl betaines, and other amphoteric surfactants such as dihydroxyl alkyl glycinate, alkyl ampho acetate or propionate, and alkylamino mono- or di-propionates. Examples of co-surfactants and additives to enhance surfactant performance may include quaternary amines, organic acids, and organic acid salts. Such co-surfactants and additives may include octanol, octanoic acid, ethoxylated carboxylates, alkyl dimethyl benzyl ammonium chloride, sodium dodecylbenzenesulfonate, sodium dodecylsulfate, lauryl alcohol, lauric acid, sodium oleate, oleic acid, and sodium salicylate.

As previously mentioned, in some embodiments, a LPG servicing fluid of the present invention may comprise LPG and a conventional hydrocarbon servicing fluid. Where a conventional hydrocarbon servicing fluid is used along with LPG, the LPG may be either gelled or ungelled. In some embodiments of the present invention, a conventional hydrocarbon fluid may be combined with a gelled or ungelled LPG fluid at or near the well head directly before the combined servicing fluid is injected into the subterranean formation. In one embodiment, the conventional hydrocarbon fluid may be gelled using conventional gelling agents suitable for hydrocarbon-based fluids. Examples of suitable gelling agents include those previously listed above. Because the LPG and conventional hydrocarbon portions of the combined servicing fluid are fully miscible when combined under pressure, any gelling agent added to either or both the LPG and conventional hydrocarbon portions will equilibrate in concentration in the combined servicing fluid. As a result, both the LPG and conventional hydrocarbon portions will be gelled if either is gelled, forming a homogeneous gelled LPG servicing fluid. In such embodiments, traditional equipment can be used to create a conventional gelled hydrocarbon fluid comprising any of the various servicing fluid additives commonly used in the art. Such additives include, but are not limited to particulates, delayed breakers, surfactants, weighting agents, and fluid loss control additives.

In those embodiments where a LPG servicing fluid of the present invention comprises LPG and a conventional hydrocarbon servicing fluid, the LPG and a conventional gelled hydrocarbon fluid may be combined in an amount sufficient to provide the desired stimulation and/or desired completion of the subterranean formation and provide maximum fluid recovery from the subterranean formation. The greater the concentration of LPG present in the LPG servicing fluid, the less of the conventional hydrocarbon servicing fluid must be recovered from the subterranean formation. In some embodiments of the present invention, it may be desirable to alter the relative percent of LPG to the conventional gelled hydrocarbon fluid throughout the life of the treatment. This may be particularly true in embodiments wherein proppant is present only in the conventional gelled hydrocarbon fluid. In such cases, it may be advantageous to adjust the LPG content of the total fluid throughout the life of the treatment to maximize LPG content while achieving the desired downhole proppant concentration. For example, where LPG and a conventional gelled hydrocarbon fluid is used as a fracturing fluid, it may be desirable to begin the treatment using a fluid comprising 100% LPG and no conventional gelled hydrocarbon fluid. As the treatment progresses, the percentage of conventional gelled hydrocarbon fluid may increase or fluctuate as needed to effect the desired downhole proppant concentration. For example, LPG may be combined with a conventional gelled hydrocarbon fluid at a well site using conventional equipment by adding proppant and other additives directly to the conventional gelled hydrocarbon fluid and then combining that fluid with LPG on the surface. In one embodiment, the proppant concentration may be held constant at the maximum concentration desired, and the ratio of LPG to the conventional gelled hydrocarbon fluid varied to achieve the desired downhole proppant concentration. Moreover, the pumping rate of both the LPG and the conventional gelled hydrocarbon fluid may be varied during the treatment to achieve the desired downhole slurry pumping rate.

Additionally, in one embodiment, a pad of gelled LPG or ungelled LPG as a spearhead fluid is introduced into the subterranean formation through a well bore to initiate fracturing of the formation. The use of pad fluids or spearhead fluids is well known in the art and may consume a variable portion of the fracturing fluid depending upon the preferences of the engineer designing the treatment. The pressure on the pad fluid or spearhead fluid is gradually increased until it exceeds the fracture gradient of the formation which is being stimulated at which time the formation breaks down and one or more fractures are created in the formation. Additional fluid then can be introduced containing proppant to maintain the created fracture in an open state after the treatment.

In some embodiments, the LPG servicing fluids of the present invention may comprise proppant particulates. Suitable proppant particulates may comprise substantially any of the materials known by individuals skilled in the art as suitable for use as a propping agent. Examples of suitable proppant particulates may include graded sand, resin coated sand, sintered bauxite, gravel, particulate garnet, nylon pellets, aluminum pellets, polymeric materials, various particulate ceramic materials, glass beads, organic materials such as crushed nut shells or seeds, resin coated organic materials, admixtures or composites of such materials and the like. The particular size of the proppant particulates employed depends on the particular formation being fractured and other variables. Generally, the proppant particulate sizes are in the range of from about 2 to about 200 mesh on the U.S. Sieve Series scale. One of ordinary skill in the art will be able to determine the appropriate size(s) of the proppant particulates based on the particular formation being fractured and other variables.

In one embodiment, as will be further discussed below, proppant particulates may be added to a LPG servicing fluid of the present invention through the use of a proppant slurry mixture comprising proppant particulates, a gelling agent and a hydrocarbon carrier fluid. In some embodiments, the proppant slurry mixtures may comprise a highly concentrated solution, e.g., 20 pounds per gallon and greater. However, the concentration can range from about 1 to 32 pounds per gallon of liquid to provide a concentration of proppant of from 0.05 to about 20 pounds per square foot of surface in a created fracture. The proppant slurry mixture may comprise any gelling agent suitable for gelling a hydrocarbon-based fluid. Examples of suitable gelling agents may include those previously listed above. In selecting the appropriate gelling agent, in some embodiments where the gelling agent comprises a metal compound and a phosphorus compound, it may be desirable to control the ratio of metal to phosphorus. For example, when the gelling agent comprises aluminum and a phosphate ester, it may be desirable to have a molar ratio of aluminum to phosphate ester in an amount of 1-1.5:3 to impart the fluid with desirable proppant suspension abilities. One of ordinary skill in the art with the benefit of this disclosure will recognize the appropriate metal to phosphorus ratio for a given application.

In some embodiments, the LPG servicing fluids of the present invention have a high apparent viscosity under low shear flow conditions. For example, in some embodiments, the LPG servicing fluids may have an apparent viscosity of about 900 cP at a shear rate of approximately 40 $sec^{-1}$ and temperature of about 190° F. In some embodiments, this is believed to be because of the crosslinked behavior of the liquid hydrocarbon and LPG that is obtained when using various gelling agents described herein. As a result, in some embodiments, it is possible to achieve an extremely stable suspension that is capable of incorporating high concentrations of proppant. This makes it possible to prepare a viscosified hydrocarbon fluid in a batch mixing unit at a well ventilated, safe blending facility and then add proppant materials to the fluid for transportation to the final job site. The concentration of the gelling agent should be determined on the required suspension time or the ability to provide some slight agitation immediately before the treatment to re-suspend any proppant that may have settled during storage.

In some embodiments, a breaker may be utilized to cause a LPG servicing fluid of the present invention to revert to a thin fluid that is produced back to the surface. A variety of delayed gel breakers can be utilized in accordance with the present invention to cause a LPG servicing fluid to revert to a thin fluid that may be produced back. The gel breakers may be materials which, as mentioned above, are combined with or otherwise present in the LPG servicing fluid. In some embodiments, the breaker may be a slowly soluble breaker so that the breaking of the gel does not take place until the slowly soluble breaker is dissolved in water. Examples of such slowly soluble breakers are given in U.S. Pat. No. 5,846,915, which is incorporated herein by reference. As indicated in U.S. Pat. No. 5,846,915, hard burned magnesium oxide having a particle size which will pass through a 200 mesh Tyler screen is preferred. Hard burned magnesium oxide and other similar breakers are not immediately present for breaking the gel due to their slowly soluble nature. Other breakers such as alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials. Such materials are well known to those skilled in the art and function to delay the breaking of the gelled hydrocarbon liquid for a required period of time. Examples of water soluble and other similar encapsulating materials which can be utilized include, but are not limited to, porous solid materials such as precipitated silica, elastomers, polyvinylidene chloride (PVDC), nylon, waxes, polyurethanes, cross-linked partially hydrolyzed acrylics and the like. When an alkaline breaker is utilized, e.g., magnesium oxide, the acid group of the phosphonic acid ester or phosphoric acid ester in the gelling agent is neutralized which initially increases the viscosity of the gelled hydrocarbon liquid after which the gel is broken.

Another type of breaker which can be utilized when the gelling agent is a ferric iron polyvalent metal salt of a phosphoric acid ester is a reducing agent that reduces ferric iron to ferrous iron. Since only ferric iron is capable of forming a viscous coordination complex with a phosphoric acid ester, alkylphosphonic acid ester, or dialkylphosphinic acid, the complex can be disassociated by reducing the ferric iron to the ferrous state. The disassociation causes the LPG servicing fluid to break. Examples of reducing agents which can be utilized include, but are not limited to, stannous chloride, thioglycolic acid (2-mercaptoacetic acid), hydrazine sulfate, sodium diethyldithiocarbamate, sodium dimethyldithiocarbamate, sodium hypophosphite, potassium iodide, hydroxylamine hydrochloride, thioglycol (2-mercaptoethaniol), ascorbic acid, sodium thiosulfate, sodium dithionite and sodium sulfite. Of these, the preferred reducing agents for use at a temperature of about 90° C. are stannous chloride, thioglycolic acid, hydrazine sulfate, sodium diethyldithiocarbamate and sodium dimethyldithiocarbamate. The most preferred reducing agent is thioglycolic acid which may be delayed by salt formation or encapsulation. As mentioned above in connection with other breakers that can be used, the reducing agent utilized can also be delayed by encapsulating it with a slowly water soluble or other similar encapsulating material.

Figure 1:
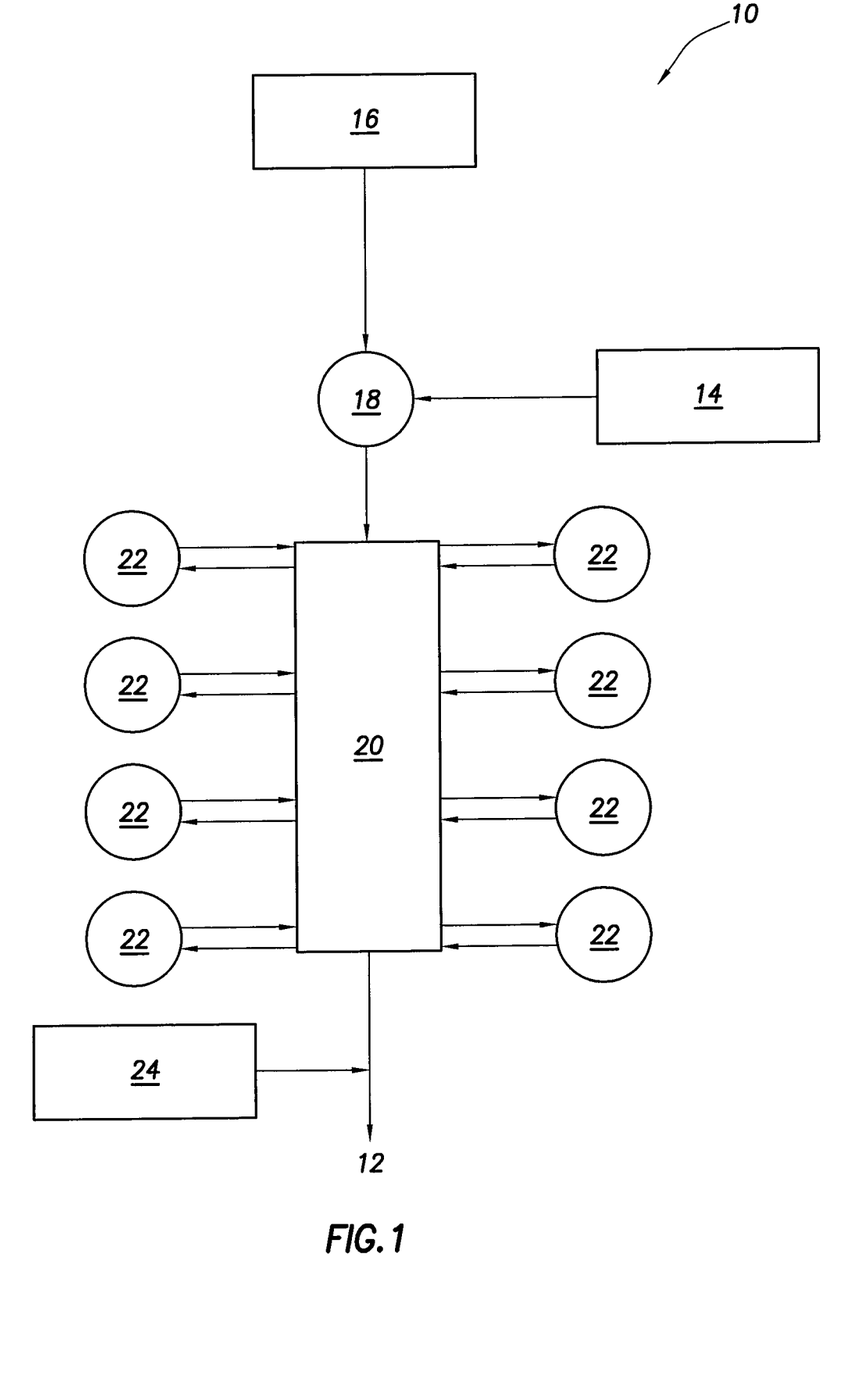
FIG. 1 is a schematic illustration of an equipment configuration suitable for practice of the present invention.

Turning to FIG. 1, a diagrammatic schematic illustration of one embodiment of an equipment configuration suitable for practice of the present invention is provided. Fluid treatment system 10 may supply a LPG servicing fluid to wellhead 12. In the embodiment of FIG. 1, fluid treatment system 10 may include LPG storage 14, LPG Fluid Modifier Storage and Metering 16, boost pump 18, manifold 20, high pressure pumps 22, and injection point 24. The LPG fluid may first be pumped from LPG storage 14 to boost pump 18 at pressures of at least about 200 psi. Optionally, at a point at, before, or after the LPG fluid enters boost pump 18, it may be mixed with any desired gelling agents or other additives from LPG Fluid Modifier Storage and Metering 16, which in some embodiments, may cause the LPG fluid to rapidly form a gelled fluid which, in some embodiments, may be capable of a controlled break. The LPG servicing fluid is then transferred to the high pressure pumps 22 via manifold 20. High pressure pumps 22 may pressurize the servicing fluid to 1,000 psi or more. After passing through high-pressure pumps 22, the pressurized LPG servicing fluid may join any additional additives, such as proppant or a conventional gelled hydrocarbon fluid from injection point 24 and be supplied to wellhead 12. An example of a high pressure pump typically used in a well servicing application is a positive displacement triplex plunger pump or a positive displacement quintaplex plunger pump, but any suitable pump may be used.

In one embodiment, injection point 24 may comprise a system for adding proppant suspended within a hydrocarbon carrier fluid to the LPG servicing fluid. In some embodiments, the proppant slurry mixture may comprise a highly concentrated solution, e.g., 20 pounds per gallon and greater. However, the concentration can range from about 1 to 32 pounds per gallon of liquid to provide a concentration of proppant of from 0.05 to about 20 pounds per square foot of surface in a created fracture. Thus, it is possible to provide concentrations of proppant from that of a partial monolayer to complete filling of a created fracture where the propped fracture will be supported by multiple proppant particles across the width of the fracture. In one embodiment, the proppant slurry mixture may be premixed and hauled to the treatment site in transports in a form commonly referred to as "Liquid Proppant." Each of the transports may contain a delivery pump for supplying the proppant slurry mixture to injection point 24, or a separate delivery pump could be incorporated in the equipment layout. The purpose of this pump is to supply the proppant slurry mixture to injection point 24 with sufficient pressure to insure that the injector/pump chambers are filled adequately for operation.

Figure 2:
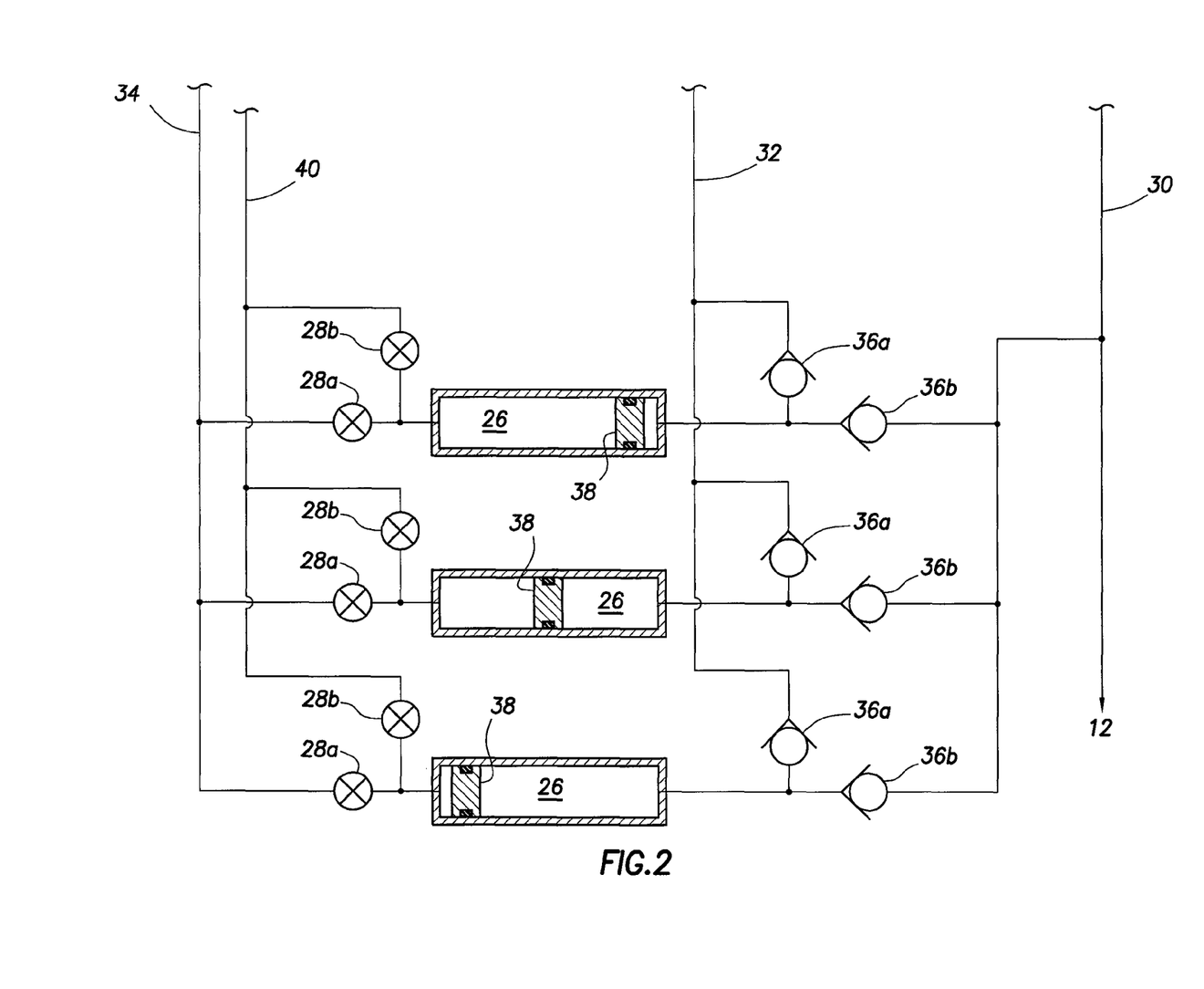
FIG. 2 is a schematic illustration of injection apparatus employing floating pistons for proppant injection.

In one embodiment, injection point 24 may be a positive displacement pump, such as those typically used in an oil field service operation. In another embodiment, injection point 24 may be a piston and cylinder arrangement as shown in FIG. 2. This apparatus may utilize multiple high pressure floating piston chambers 26 and controlled valves 28 to continually introduce a proppant slurry mixture into high pressure flow line 30 flowing to wellhead 12. Inlet proppant flow line 32 may supply a proppant slurry mixture with a minimum constant pressure. When one of chambers 26 is opened to atmospheric pressure through bleed line 34, the pressure supplied in the proppant flow line 32 may be sufficient to open check valve 36a and move floating piston 38 in chamber 26. When chamber 26 is sufficiently filled, the control valve 28a to bleed line 34 may be closed and control valve 28b to pressurizing fluid line 40 may be opened. Since floating piston 38 in the chamber 26 floats, the pressure may be equalized. The high pressure applied on floating piston 38 in chamber 26 with the proppant laden fluid may then push the pressurized proppant slurry mixture through check valve 36b into high pressure flow line 30 going to wellhead 12. Bleed line 34 may return the pressurizing fluid to storage tanks (not shown) for recycle in the system. The pressurizing fluid can comprise substantially any fluid such as water, hydraulic fluid or any other suitable fluid capable of driving the floating piston. The control valves 28 may be electrically controlled by a computerized control system, or manually, hydraulically, or otherwise operated.

The volume available in chamber 26 and number of chambers may be sufficient to allow continuous operation at average injection rates of from about 200 to 900 gallons per minute or more. The pressure differential across floating piston 38 may be only enough to overcome piston friction, unless floating piston 38 is allowed to seat when filling with proppant. In this case, the pressure may be equivalent to the supply pressure of the proppant slurry mixture. A pressure relief valve (not shown) on the pressurizing fluid supply line may prevent a large pressure differential if floating piston 38 was allowed to seat on the power stroke of the piston.

Figure 3:
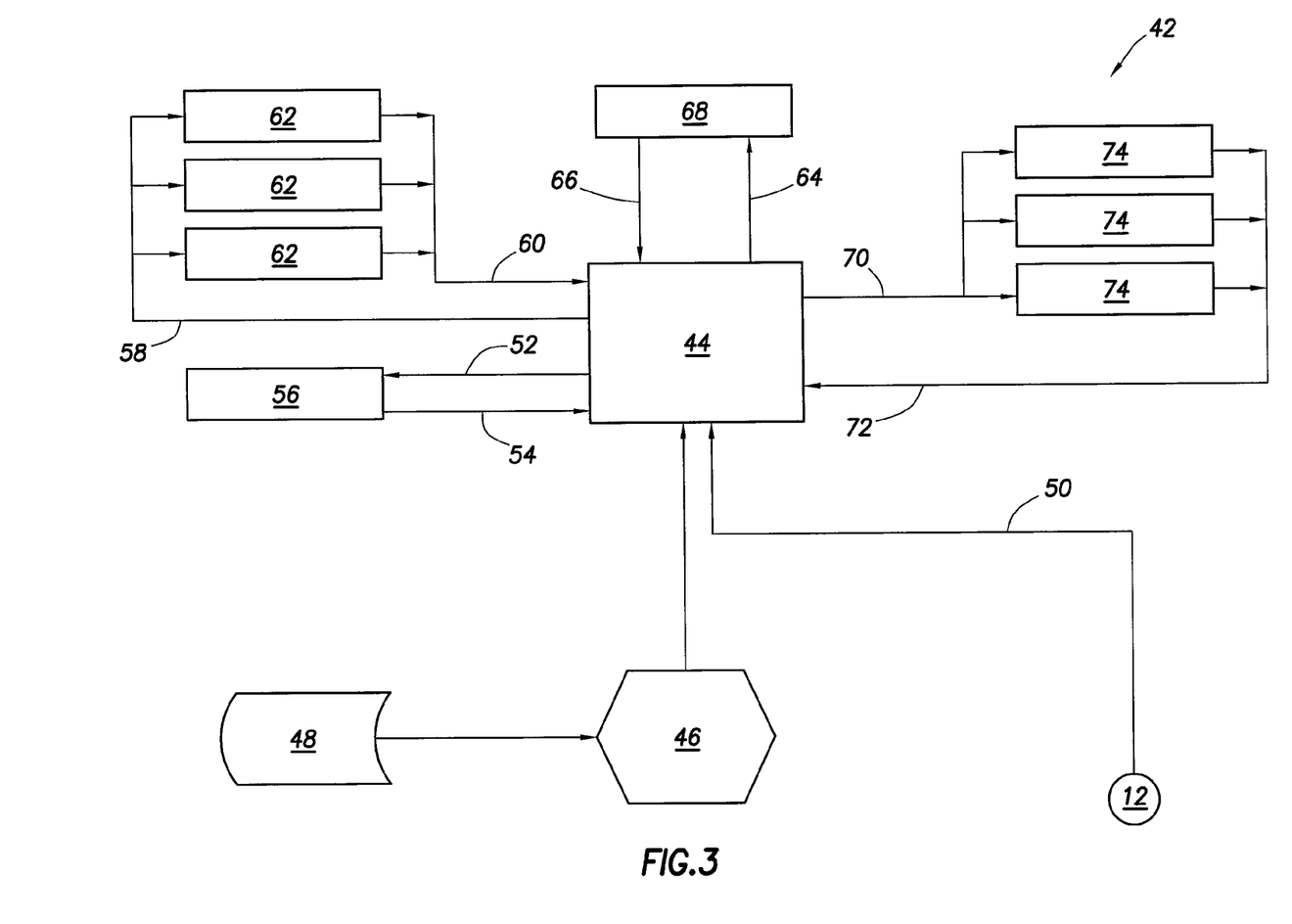
FIG. 3 is a diagrammatic illustration of a control system for the operation of the equipment necessary to accomplish a treatment in accordance with the present invention.

Turning now to FIG. 3, a diagrammatic illustration of one embodiment of a control system 42 for the operation of the equipment to accomplish a treatment is provided. The treatment proppant concentration may be defined by the number of pounds of proppant in a gallon of treating fluid. This ratio of proppant to fluid may be automatically controlled by job control processor 44. Job control processor 44 may monitor various sensors and makes changes in pump rates, proppant slurry mixture injection rates, treating pressures, fluid modifier metering pumps (any chemical additives admixed with the treatment fluid) and the LPG boost pump to deliver the treating fluid to the well bore at the desired job parameters. Before the treatment begins, desired job parameters 46 may be loaded into job control processor 44. Job parameters 46 may be dictated by desired job rate, proppant concentration, treating pressure, liquid additive rates, and pump schedule as indicated at 48. Once a treatment begins, job control processor 44 may communicate set points and sense actual values of the various job parameters 46. Job control processor 44 may then make adjustments to the set points, causing the actual values to approach desired values. At 50, job control processor 44 may sense well head actual rate, pressure, and fluid properties at well head 12. Job control processor 44 may communicate set point rate 52 and sense actual rate 54 of proppant injector unit controller 56 to provide a desired rate of injection of the proppant slurry mixture. Similarly, job control processor 44 may communicate set point rate 58 and sense actual rate 60 of liquid additive unit controllers 62 to provide desired rates of liquid additives. Job control processor 44 may also communicate set point rate 64 and sense actual rate 66 of LPG boost pump unit controller 68 to provide a desired pump rate for a servicing fluid comprising LPG. Finally, job control processor 44 may communicate set point rates 70 and sense actual rates 72 of pumping unit controllers 74 to provide desired pump rates for pumping units.

Job control processor 44, as is known by those individuals of ordinary skill in the art, may control all of the equipment on location related to blending, mixing and pumping the treatment using appropriate sensors and data feedback loops to properly monitor the operations. The equipment types may include but are not limited to the LPG transports, LPG booster pump, fluid modifier metering pump(s), proppant slurry mixture transport and supply pump, proppant supply injection pumps and the high pressure gelled LPG pumps such as illustrated in FIGS. 1 and 2. Various control systems and the equipment necessary to effect the same are illustrated for example in U.S. Pat. Nos. 7,270,141 and 7,516,793; and U.S. Patent Publications Nos. 2006/0235627A1, 2006/0177203A1, 2006/0176640A1, 2008/0183415A1, 2008/0179056A1, 2008/0183336A1, 2008/0183310A1, 2008/0084783A1, and 2009/0053072A1, the entire disclosures of which are incorporated herein by reference.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, RL, and an upper limit, RU, is disclosed, any number falling within the range is specifically disclosed. In particular, the following numbers within the range are specifically disclosed: $R=RL+k*(RU-RL)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
   providing a LPG servicing fluid comprising LPG and a gelling agent;
   providing proppant particulates suspended in a hydrocarbon carrier fluid;
   pressurizing the LPG servicing fluid with one or more high-pressure pumps operating at 1,000 psi or more;
   introducing the proppant particulates suspended in a hydrocarbon carrier fluid into at least a portion of the LPG servicing fluid using one or more high pressure pumps operating at 1,000 psi or more; and
   introducing the LPG servicing fluid comprising proppant particulates into at least a portion of a subterranean formation at a rate and pressure sufficient to create or enhance at least one or more fractures therein;
   wherein the proppant particulates are introduced to the LPG servicing fluid after pressurizing the LPG servicing fluid with the one or more high pressure pumps but before introducing the LPG servicing fluid to the portion of the subterranean formation.

2. The method of claim 1 wherein the LPG servicing fluid further comprises a delayed release breaker.

3. The method of claim 1 wherein the proppant particulates are introduced into the LPG servicing fluid using a floating piston pump.

4. The method of claim 1 wherein the proppant particulates are introduced into the LPG servicing fluid using a positive displacement pump.

5. The method of claim 1 wherein the amount of the proppant particulates in the hydrocarbon carrier fluid is at least 20 pounds per gallon.

6. The method of claim 1 wherein a computerized processor regulates introducing proppant particulates into the LPG servicing fluid.

7. The method of claim 1 further comprising:
   introducing a pad of gelled LPG or ungelled LPG to the subterranean formation to initiate fracturing thereof, before introducing the LPG servicing fluid comprising proppant particulates to the subterranean formation.

8. A method comprising:
   providing LPG;
   providing a gelling agent;
   providing proppant particulates suspended in a hydrocarbon carrier fluid;
   metering the gelling agent into the LPG on-the-fly to form a LPG servicing fluid;
   pressurizing the LPG servicing fluid with one or more high-pressure pumps operating at 1,000 psi or more;
   introducing the proppant particulates suspended in a hydrocarbon carrier fluid into at least a portion of the LPG servicing fluid using one or more high pressure pumps operating at 1,000 psi or more; and
   introducing the LPG servicing fluid into at least a portion of a subterranean formation;
     wherein the proppant particulates are introduced to the LPG servicing fluid after pressurizing the LPG servicing fluid with the one or more high Pressure pumps but before introducing the LPG servicing fluid to the portion of the subterranean formation.

9. The method of claim 8 wherein the LPG servicing fluid further comprises a delayed release breaker.

10. The method of claim 8 wherein the proppant particulates are introduced into the LPG servicing fluid using a floating piston pump.

11. The method of claim 8 wherein the proppant particulates are introduced into the LPG servicing fluid using a positive displacement pump.

12. The method of claim 8 wherein a computerized processor regulates introducing proppant particulates into the LPG servicing fluid.

13. A method comprising:
providing a LPG servicing fluid comprising LPG and a gelling agent;
pressurizing the LPG servicing fluid with one or more high-pressure pumps operating at 1,000 psi or more;
introducing proppant particulates into at least a portion of the LPG servicing fluid using a floating piston pump operating at 1,000 psi or more; and
introducing the LPG servicing fluid comprising proppant particulates into at least a portion of a subterranean formation at a rate and pressure sufficient to create or enhance at least one or more fractures therein.

14. The method of claim 13 wherein the LPG servicing fluid further comprises a delayed release breaker.

15. The method of claim 13 wherein a computerized processor regulates introducing the proppant particulates to the LPG servicing fluid.

16. The method of claim 13 further comprising:
introducing a pad of gelled LPG or ungelled LPG to the subterranean formation to initiate fracturing thereof, before introducing the LPG servicing fluid comprising proppant particulates to the subterranean formation.

17. A method comprising:
providing LPG;
providing a gelling agent;
metering the gelling agent into the LPG on-the-fly to form a LPG servicing fluid;
pressurizing the LPG servicing fluid with one or more high-pressure pumps operating at 1,000 psi or more;
introducing proppant particulates into at least a portion of the LPG servicing fluid using a floating piston pump operating at 1,000 psi or more; and
introducing the LPG servicing fluid into at least a portion of a subterranean formation.

18. The method of claim 17 wherein the LPG servicing fluid further comprises a delayed release breaker.

19. The method of claim 17 wherein a computerized processor regulates introducing the proppant particulates to the LPG servicing fluid.

20. The method of claim 17 further comprising:
introducing a pad of gelled LPG or ungelled LPG to the subterranean formation to initiate fracturing thereof.

* * * * *